US009739370B2

(12) United States Patent
Yang

(10) Patent No.: US 9,739,370 B2
(45) Date of Patent: Aug. 22, 2017

(54) SHIFTING CONTROL METHOD FOR VEHICLE

(71) Applicant: Hyundai Motor Company, Seoul (KR)

(72) Inventor: Jae Sik Yang, Bucheon-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/169,401

(22) Filed: May 31, 2016

(65) Prior Publication Data

US 2017/0167601 A1    Jun. 15, 2017

(30) Foreign Application Priority Data

Dec. 9, 2015 (KR) .................. 10-2015-0175311

(51) Int. Cl.
*F16H 61/02* (2006.01)
*F16H 59/46* (2006.01)
*F16H 59/36* (2006.01)
*F16H 59/24* (2006.01)
*F16H 59/18* (2006.01)

(52) U.S. Cl.
CPC ......... *F16H 61/0213* (2013.01); *F16H 59/18* (2013.01); *F16H 59/24* (2013.01); *F16H 59/36* (2013.01); *F16H 59/46* (2013.01); *F16H 2059/366* (2013.01); *F16H 2059/467* (2013.01)

(58) Field of Classification Search
None
See application file for complete search history.

(56) References Cited

U.S. PATENT DOCUMENTS

| 5,637,052 A * | 6/1997 | Hirota | F16H 61/0213 |
| | | | 477/11 |
| 2004/0078130 A1* | 4/2004 | Segawa | F16H 61/143 |
| | | | 701/67 |
| 2011/0130928 A1* | 6/2011 | Matsunaga | F16H 61/10 |
| | | | 701/52 |

FOREIGN PATENT DOCUMENTS

| JP | 2005-337410 A | 12/2005 |
| JP | 2008-111541 A | 5/2008 |
| KR | 1998-060051 A | 10/1998 |
| KR | 2010-0091498 A | 8/2010 |
| KR | 2012-0068542 A | 6/2012 |
| KR | 2013-0064605 A | 6/2013 |
| KR | 2014-0029743 A | 3/2014 |

* cited by examiner

*Primary Examiner* — Edwin A Young
(74) *Attorney, Agent, or Firm* — Morgan Lewis & Bockius LLP

(57) ABSTRACT

A shifting control method for a vehicle may include a Wide Open Throttle (WOT) determination, by a controller, of determining whether the vehicle is in a WOT condition, a shift RPM determination, by the controller, of determining shift RPM using turbine RPM and slip RPM, when it is determined in the WOT determination that the vehicle is in the WOT condition, an estimated RPM determination, by the controller, of determining estimated RPM based on the shift RPM and a rate of change of the turbine RPM after the shift RPM determination, the estimated RPM being the shift RPM after a preset time period, an estimated RPM comparison, by the controller, of comparing the estimated RPM with a first preset RPM after the estimated RPM determination, and a shifting processing, by the controller, of performing upshifting when the estimated RPM is equal to or greater than the first preset RPM.

8 Claims, 3 Drawing Sheets

SHIFTING CONTROL METHOD FOR VEHICLE

CROSS REFERENCE TO RELATED APPLICATION

The present application claims priority to Korean Patent Application No. 10-2015-0175311, filed Dec. 9, 2015, the entire contents of which is incorporated herein for all purposes by this reference.

BACKGROUND OF THE INVENTION

Field of the Invention

The present invention relates to a shifting control method for performing shifting at the maximum revolutions per minute (RPM) of an engine when a vehicle is in a Wide Open Throttle (WOT) condition.

Description of Related Art

In the case of a vehicle having an Automatic Transmission (AT) or an Automated Manual Transmission (AMT), shifting is performed according to a predefined shift pattern during Wide Open Throttle (WOT) acceleration in which a driver fully depresses an accelerator pedal.

A shift pattern may be provided as a map that is made using turbine RPM and the opening degree of an accelerator pedal. Specifically, the shift pattern may be provided by mapping shifting time onto engine RPM after a manufacturer checks the engine RPM depending on the opening degree of the accelerator pedal and the turbine RPM through preliminary inspection. Generally, when a vehicle is in a WOT condition, the shift pattern is determined to perform shifting at the maximum RPM of the engine.

However, the shifting time of a vehicle may be different depending on other conditions (an ambient temperature, a road gradient, variation in engine performance, and the like). If the shifting time is slightly delayed during 1-2 upshift in which the engine RPM rapidly increase, actual shifting may be performed after the engine RPM exceeds the maximum permissible RPM. In this case, because torque is limited to protect the engine, the sense of acceleration decreases and a shock may occur.

Conversely, when the ambient temperature is high or when a vehicle is in a hilly area, engine power is decreased. Therefore, even if shifting is performed according to the shift pattern based on the RPM of the output shaft of the transmission, shifting is performed when the engine RPM is less than the maximum permissible RPM. Accordingly, the engine may not realize the maximum performance, thus decreasing power performance of the vehicle.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shifting control method that enables shifting at the maximum permissible RPM of an engine in a vehicle that is driven in a WOT condition.

According to various aspects of the present invention, a shifting control method for a vehicle may include a Wide Open Throttle (WOT) determination, by a controller, of determining whether the vehicle is in a WOT condition, a shift RPM determination, by the controller, of determining shift RPM using turbine RPM and slip RPM, when it is determined in the WOT determination that the vehicle is in the WOT condition, an estimated RPM determination, by the controller, of determining estimated RPM based on the shift RPM and a rate of change of the turbine RPM after the shift RPM determination, the estimated RPM being the shift RPM after a preset time period, an estimated RPM comparison, by the controller, of comparing the estimated RPM with a first preset RPM after the estimated RPM determination, and a shifting processing, by the controller, of performing upshifting when the estimated RPM is equal to or greater than the first preset RPM as a result of the estimated RPM comparison.

In the shift RPM determination, the controller may determine the slip RPM by subtracting the turbine RPM from engine RPM, and then determine the shift RPM by adding the determined slip RPM to the turbine RPM.

The first preset RPM may be a maximum permissible revolutions of an engine in a current shift range.

The shifting control method may further include a shift RPM comparison, by the controller, of comparing the shift RPM with a second preset RPM that is set to be less than the first preset RPM, after the shift RPM determination, in which the controller may perform the estimated RPM determination when the shift RPM is equal to or greater than the second preset RPM as a result of the shift RPM comparison.

When the estimated RPM is less than the first preset RPM as a result of the estimated RPM comparison, the estimated RPM determination may be performed again.

When the estimated RPM is less than the first preset RPM as a result of the estimated RPM comparison, the controller may not perform upshifting according to a shift pattern even when a request for upshifting according to the shift pattern is generated.

The preset time period may be a time period during which completion of upshifting is delayed from when the controller transmits a shifting signal to the transmission.

The controller may determine whether the vehicle is in the WOT condition by receiving, from an Accelerator Position Sensor (APS), an opening degree of an accelerator pedal configured to be coupled to the APS.

In the estimated RPM calculation step, the controller may set the second preset RPM to be lower as the rate of the change of the turbine RPM is higher.

According to the shifting control method for a vehicle configured as described above, regardless of external environment conditions, shifting may be performed accurately when the shift RPM reaches the maximum permissible RPM, whereby the driving performance of the vehicle may be maximized, and the decrease of drive quality and the occurrence of a shock may be prevented.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
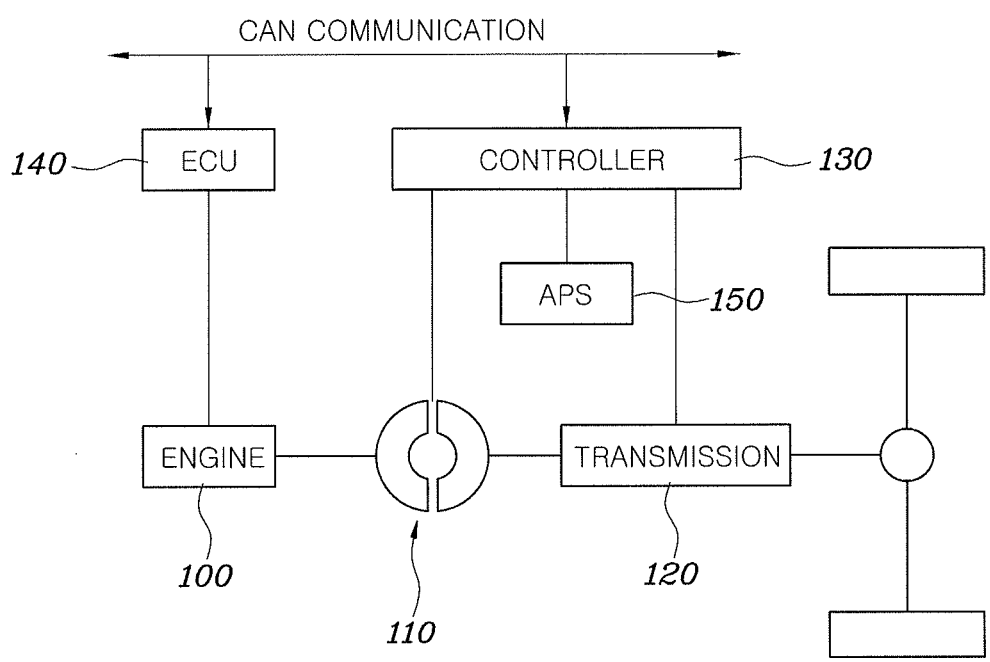
FIG. 2 is a view illustrating a shifting control device for a vehicle according to the present invention.

FIG. 2 is a view illustrating a shifting control device for a vehicle according to various embodiments of the present invention. Referring to FIG. 2, the shifting control device for a vehicle may include a torque converter 110 arranged between an engine 100 and a transmission 120, an ECU 140 for receiving the revolutions of the engine 100, and a controller 130 for receiving the revolutions of a turbine in the torque converter 110 and for controlling the shifting time of the transmission 120. The controller 130 and the ECU 140 may send and receive information signals between each other through Controller Area Network (CAN) communication. The specific functions of these components will be described later along with a control method therefor.

Figure 1:
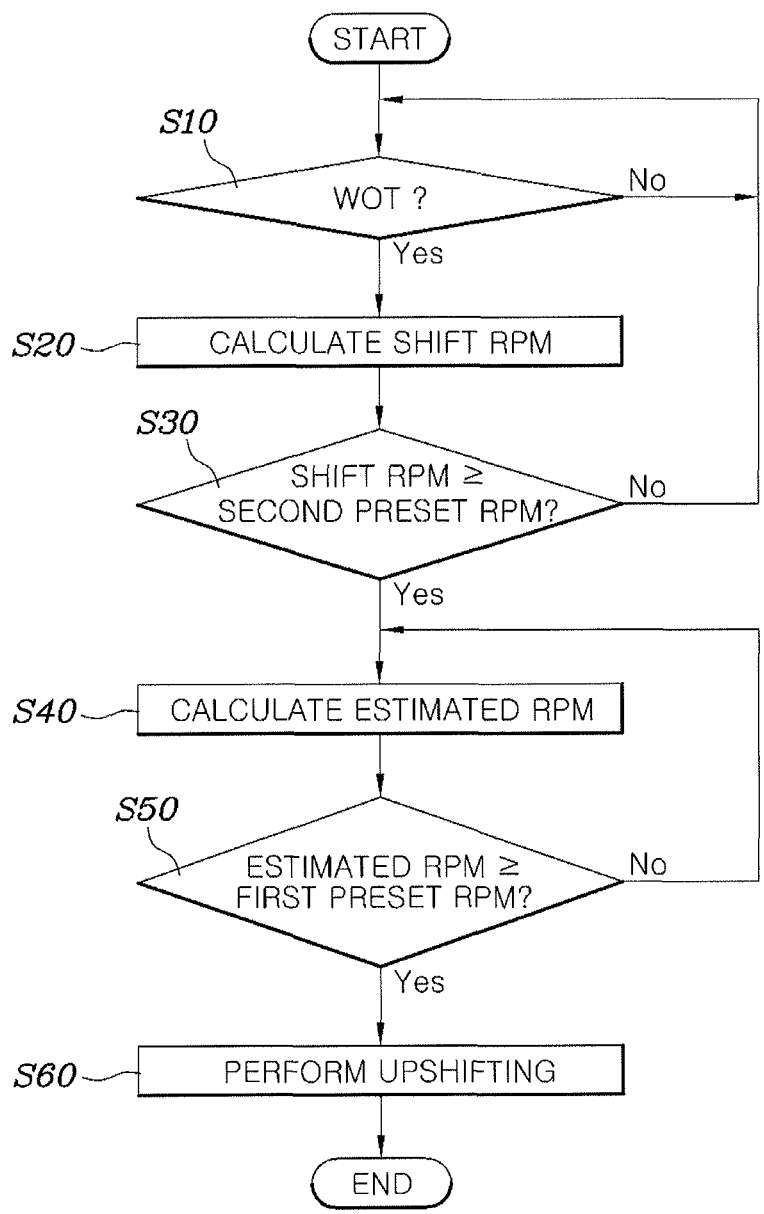
FIG. 1 is a flowchart illustrating an exemplary shifting control method for a vehicle according to the present invention.

FIG. 1 is a flowchart illustrating a shifting control method for a vehicle according to various embodiments of the present invention. Referring to FIGS. 1 and 2, the shifting control method for a vehicle may include a WOT determination step (S10) in which the controller 130 determines whether a vehicle in a WOT condition, a shift RPM calculation step (S20) in which the controller 130 calculates shift RPM using turbine RPM and slip RPM when it is determined in the WOT determination step (S10) that the vehicle is in the WOT condition, an estimated RPM calculation step (S40) in which, after the shift RPM calculation step (S20), the controller 30 calculates estimated RPM, which is shift RPM after a preset time period, based on the shift RPM and the rate of change of the turbine RPM, an estimated RPM comparison step (S50) in which, after the estimated RPM calculation step (S40), the controller 130 compares the estimated RPM with a first preset RPM, and a shifting processing step (S60) in which the controller 30 performs upshifting when the estimated RPM is equal to greater than the first preset RPM as the result of the estimated RPM comparison step (S50).

Using the opening degree of an accelerator pedal received from an Accelerator Position Sensor (APS) 150, the controller 130 may determine whether a vehicle is in a Wide Open Throttle (WOT) condition in which a driver fully depresses the accelerator pedal.

In the case of a vehicle in a WOT condition, it is desirable to perform upshifting when the revolutions of the engine 100 reach the maximum permissible revolutions so as to operate the engine at its maximum performance. To this end, a conventional method compares the turbine RPM with the maximum permissible RPM of an engine in order to exclude a state in which a torque converter is fully open, and performs upshifting of a transmission when the turbine RPM reaches the maximum permissible RPM of the engine.

However, the present invention calculates shift RPM based on the slip RPM and turbine RPM in the torque converter 110, and compares the calculated shift RPM with the maximum permissible RPM of the engine 100, whereby upshifting may be performed at a more accurate shifting time.

Here, at the shift RPM calculation step (S20), the controller 130 calculates the slip RPM by subtracting the turbine RPM from the engine RPM and then calculates the shift RPM by adding the calculated slip RPM to the turbine RPM. In this case, if a damper clutch is closed, the slip RPM is set to 0.

In other words, the slip RPM in the torque converter 110 is calculated by the difference between the revolutions of the engine 100 and the revolutions of the turbine of the torque converter 110. However, if the damper clutch is closed, torque converter 110 is completely engaged and slip is not generated. Accordingly, the slip RPM may be set to 0.

Therefore, if the torque converter is not fully closed, the calculated shift RPM is the same as the engine RPM, whereas if the damper clutch is closed, the calculated shift RPM is the same as the turbine RPM.

Therefore, the shift RPM is calculated as an indicator for shifting in consideration of the turbine RPM and the slip RPM in the torque converter 110, and the accurate shifting time for upshifting of the transmission 120 is determined using the shift RPM, whereby shifting in which the performance of the engine 100 can be maximized may be performed.

Also, the controller 130 may calculate the rate of change of the turbine RPM in addition to the shift RPM. Here, the rate of change of the turbine RPM indicates the rate of increase of the turbine RPM.

Subsequently, the controller 130 multiplies the rate of change of the turbine RPM by a preset time period and then adds it to the current shift RPM, whereby the estimated RPM, which is the shift RPM expected after the preset time period from the current time, may be calculated at step S40. Consequently, because the controller 130 estimates the shift RPM after the preset time period, the shift RPM may be prevented from exceeding the maximum permissible RPM of the engine when shifting is performed.

Here, the preset time period may be a time period during which the completion of upshifting is delayed from when the controller 130 transmits a shifting signal to the transmission 120.

Subsequently, the controller 130 compares the calculated estimated RPM with the first preset RPM, which is the maximum permissible RPM of the engine in the current shift range at step S50. If the estimated RPM is the same as the first preset RPM, because the shift RPM will reach the maximum permissible RPM of the engine after the preset time period, upshifting of the transmission 120 may be immediately performed.

Therefore, upshifting may be performed at the accurate time at which the engine RPM reaches the maximum permissible RPM of the engine. Accordingly, the maximum performance of the engine may be implemented, and a situation in which torque is limited because the engine RPM exceeds the maximum permissible RPM is prevented. Therefore, decrease of the drive quality of vehicle and the occurrence of a shock may be avoided.

Also, if the estimated RPM exceeds the first preset RPM as the result of the estimated RPM comparison step (S50), the controller 130 may immediately perform upshifting. In other words, if the estimated RPM exceeds the first preset RPM, even if the controller 130 immediately approves the shift command, the shift RPM will exceed the first RPM due to the delay time. Therefore, in order to ensure the drive quality of the vehicle as much as possible and to prevent a large shock, upshifting may be immediately performed.

Conversely, as the result of the estimated RPM comparison step (S50), if the estimated RPM is less than the first preset RPM, the estimated RPM calculation step (S40) may be performed again.

Also, if the estimated RPM is less than the first preset RPM as the result of the estimated RPM comparison step (S50), the controller 130 does not perform upshifting according to a shift pattern even if a request for upshifting according to the shift pattern is generated.

Specifically, when a vehicle is in a high temperature condition or is in a hilly area, the engine power is decreased. Accordingly, a vehicle that performs shifting according to the conventional shift pattern based on the turbine RPM performs upshifting under the condition in which the engine RPM does not reach the maximum permissible RPM.

In the present invention, when the estimated RPM is less than the first preset RPM, the controller 130 delays upshifting and calculates the estimated RPM again in order to operate the engine 100 at the maximum performance. Therefore, the maximum performance of the engine 100 may be used, and the marketability of the vehicle may be improved.

Meanwhile, after the shift RPM calculation step (S20), a shift RPM comparison step (S30) in which the controller 130 compares the shift RPM with second preset RPM that is less than the first preset RPM may be further included. If the shift RPM is equal to or greater than the second RPM as the result of the shift RPM comparison step (S30), the controller 130 may perform the estimated RPM calculation step (S40).

For example, if the second preset RPM is set to 80% of the first preset RPM, the controller 130 calculates the estimated RPM only when the estimated RPM is equal to or greater than 80% of the first preset RPM. Therefore, when there is a big difference between the shift RPM and the maximum permissible RPM of the engine, the unnecessary calculation of the estimated RPM may be prevented. Here, the above-mentioned second preset RPM is an example according to various embodiment, and the value may be freely set to be less than the first preset RPM depending on the vehicle or the decision of a designer, rather than being limited to a specific value.

Figure 3:
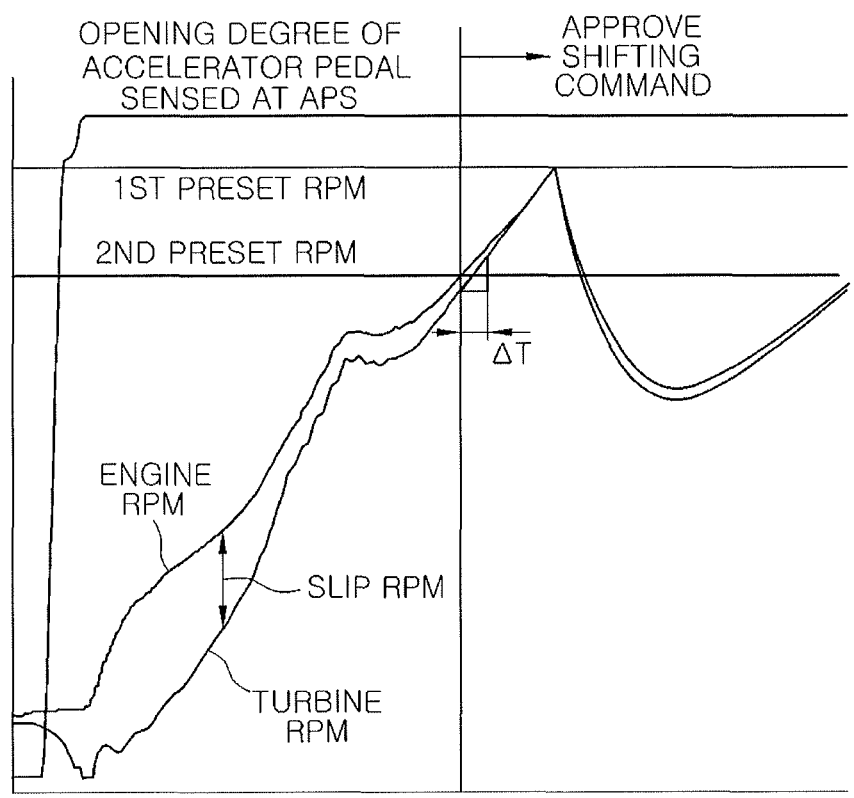
FIG. 3 is a graph illustrating a change in shift RPM when shifting is performed according to an embodiment of the present invention.

FIG. 3 is a graph illustrating the change in the shift RPM when shifting is performed according to various embodiments of the present invention. Referring to FIG. 3, during WOT acceleration, when the shift RPM reaches the second preset RPM, the estimated RPM after the preset time duration ($\Delta T$) is calculated using the shift RPM and the rate of change of the turbine RPM. When the calculated estimated RPM reaches the first preset RPM, a shifting command is approved, whereby upshifting is performed at the accurate time at which the shift RPM reaches the first preset RPM.

Additionally, the controller 130 is a Transmission Control Unit (TCU), and may receive the turbine RPM from a separate sensor for measuring the turbine RPM. Also, the ECU 140 may receive the engine RPM using an additional sensor, and the TCU 130 may receive the engine RPM from the ECU 140 through the CAN communication with the ECU 140.

According to the shifting control method configured as described above, regardless of external environment conditions, shifting may be performed accurately when the shift RPM reaches the maximum permissible RPM, whereby the decrease of drive quality and the occurrence of a shock may be prevented.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shifting control method for a vehicle, comprising:
    a Wide Open Throttle (WOT) determination, by a controller, of determining whether the vehicle is in a WOT condition;
    a shift RPM determination, by the controller, of determining shift Revolution Per Minute (RPM) using turbine RPM and slip RPM, when it is determined in the WOT determination that the vehicle is in the WOT condition, wherein the turbine RPM is RPM of a turbine in a torque converter and the slip RPM is a difference of the turbine RPM and an engine RPM;
    an estimated RPM determination, by the controller, of determining estimated RPM based on the shift RPM and a rate of change of the turbine RPM after the shift RPM determination, the estimated RPM being the shift RPM after a preset time period;
    an estimated RPM comparison, by the controller, of comparing the estimated RPM with a first preset RPM after the estimated RPM determination; and
    a shifting processing, by the controller, of performing upshifting when the estimated RPM is equal to or greater than the first preset RPM as a result of the estimated RPM comparison.

2. The shifting control method of claim 1, wherein in the shift RPM determination,
    the controller determines the slip RPM by subtracting the turbine RPM from the engine RPM, and then determines the shift RPM by adding the determined slip RPM to the turbine RPM.

3. The shifting control method of claim 1, wherein the first preset RPM is maximum permissible revolutions of an engine in a current shift range.

4. The shifting control method of claim 1, further comprising a shift RPM comparison, by the controller, of comparing the shift RPM with a second preset RPM that is set to be less than the first preset RPM, after the shift RPM determination, wherein the controller performs the estimated RPM determination when the shift RPM is equal to or greater than the second preset RPM as a result of the shift RPM comparison.

5. The shifting control method of claim 1, wherein when the estimated RPM is less than the first preset RPM as a result of the estimated RPM comparison, the estimated RPM determination is performed again.

6. The shifting control method of claim 1, wherein when the estimated RPM is less than the first preset RPM as a result of the estimated RPM comparison, the controller does not perform upshifting according to a shift pattern even when a request for upshifting according to the shift pattern is generated.

7. The shifting control method of claim 1, wherein the preset time period is a time period during which completion of upshifting is delayed from when the controller transmits a shifting signal to the transmission.

8. The shifting control method of claim 1, wherein the controller determines whether the vehicle is in the WOT condition by receiving, from an Accelerator Position Sensor (APS), an opening degree of an accelerator pedal configured to be coupled to the APS.

* * * * *